United States Patent [19]

Harmon et al.

[11] 4,347,328

[45] Aug. 31, 1982

[54] ANTI-CLUMPING OF ION EXCHANGE RESINS

[75] Inventors: Zita T. K. Harmon; Lowell B. Lindy, both of Midland, Mich.

[73] Assignee: The Dow Chemical Company, Midland, Mich.

[21] Appl. No.: 185,083

[22] Filed: Sep. 8, 1980

[51] Int. Cl.$^3$ .......................... B01J 39/18; B01J 41/12
[52] U.S. Cl. .......................................... 521/28; 521/30
[58] Field of Search ............................. 521/28, 30, 32

[56] References Cited

U.S. PATENT DOCUMENTS

| 2,961,417 | 11/1960 | Small | 521/28 |
| 4,101,460 | 7/1978 | Small et al. | 521/28 |
| 4,119,580 | 10/1978 | Smith, Jr. et al. | 521/28 |

FOREIGN PATENT DOCUMENTS 1045978  7/1957  Fed. Rep. of Germany ........ 521/28

OTHER PUBLICATIONS

Rohm & Haas Co., Feb. 1967, "Declumping of Anion and Cation Exchange Resins".

*Primary Examiner*—William F. Hamrock
*Assistant Examiner*—Peter F. Kulkosky

[57] ABSTRACT

The agglomeration or clumping of the resins in a resin bed comprising a mixture of anion and cation exchange resins is effectively reduced by treating the anion or cation resin with an aqueous dispersion of water-insoluble polymer particles having a particle size of from about 100 to about 800 Å and bearing a moiety having opposite ionic character than the resin being treated. For example, the surface charge exhibited by a strong base anion exchange resin bearing pendant quaternary ammonium groups is reduced by contacting the resin with a colloidal aqueous dispersion of a water-insoluble polymer of a monovinylidene aromatic such as styrene and a small amount of a polyvinylidene aromatic such as divinylbenzene which polymer bears pendant sulfonate groups. The thus treated anion exchange resin can subsequently be mixed with a cation exchange resin to form a mixed resin bed having reduced clumping of resins without coincident decrease in efficiency.

14 Claims, No Drawings

ANTI-CLUMPING OF ION EXCHANGE RESINS

BACKGROUND OF THE INVENTION

This invention relates to a method for reducing the surface charge of an ion exchange resin, to a method for reducing the agglomeration of the ion exchange resins in a mixed resin bed containing a cation exchange resin and an anion exchange resin and to the mixed resin bed exhibiting such reduced agglomeration.

In the deionization of water and other liquids, the liquid being deionized is often contacted with both anion and cation exchange resins to remove the undesirable ionic components therefrom. Although the contaminated liquid can be sequentially contacted with one resin type and thereafter with the other resin type, the liquid is more conventionally contacted with a resin bed containing a mixture of the anion and cation exchange resins, i.e., a mixed resin bed.

Due to the attraction caused by the oppositely charged surfaces of the two resins, the cation and anion exchange resins in such mixed resin bed often cling or clump together forming agglomerates of resin. Unfortunately, such attraction often causes difficulties in separating the cation and anion exchange resin into their respective resin types upon backwashing the mixed resin bed in preparation for the regeneration of the resins. In addition, resin agglomeration is characterized by the mixed resin bed possessing a relatively high void volume which often causes undesirable flow distribution of liquids through the bed, e.g., channeling, relatively low utilization of the resin's ion exchange capacity and a generally inefficient ion exchange operation.

Various methods have been employed heretofore to reduce the surface charge exhibited by the anion or cation exchange resin, thereby reducing the clumping of the resins in a mixed resin bed. For example, the prior art method of U.S. Pat. No. 2,961,417 proposes neutralizing the surface charge of the anion resin component of a mixed resin bed by treating the resin with an aqueous solution of an anionic resinous polyelectrolyte, e.g., a sulfonated polystyrene. Similarly, the surface charge on the cation resin is effectively neutralized using an aqueous solution of a cationic, resinous polyelectrolyte. In another method, the surface charge exhibited by the anion resin is neutralized by treating the resin with an emulsion of a pH responsive, swellable, cross-linked polymer bearing pendant anionic groups, e.g., carboxylic groups. Treatment of an anion exchange resin component of a mixed resin bed using either of these methods will reduce the clumping of the resins in said mixed resin bed. Unfortunately, however, the kinetics of the treated resin, i.e., the rate at which the treated resin can exchange the ionic components in solution, is also reduced, thereby lowering the overall efficiency of the mixed resin bed.

In view of the stated deficiencies of the prior art methods for neutralizing the surface charge exhibited by an ion exchange resin and for reducing the clumping exhibited by a resin bed containing a mixture of cation and anion exchange resins, it would be highly desirable to provide a method for effectively reducing the surface charge exhibited by an ion exchange resin thereby coincidentally reducing the clumping of the anion and cation resins in a mixed resin bed without affecting the resin's other properties.

SUMMARY OF THE INVENTION

Accordingly, in one aspect, the present invention is a method for neutralizing the surface charge exhibited by an ion exchange resin. Said method comprises the step of contacting the ion exchange resin with an aqueous dispersion of water-insoluble polymer particles having a number average particle size from about 100 to about 800 Å and bearing a moiety having an opposite ionic character than the ion exchange resin being treated. Said water-insoluble polymer particles are employed in an amount sufficient to reduce the surface charge of the ion exchange resin.

In another aspect, the present invention is an ion exchange material having a reduced surface charge which ion exchange material comprises an ion exchange resin and water-insoluble polymer particles having a number average particle size from about 100 to about 800 Å and bearing a moiety having an opposite ionic character than the ion exchange resin in an amount sufficient to reduce the surface charge of the ion exchange resin.

In yet another aspect, the present invention is a method for reducing the clumping or interaction between the anion and cation exchange resins in a resin bed containing a mixture of the anion and cation resins, said method comprising the step of contacting either the anion or cation resin with an aqueous dispersion of water-insoluble polymer particles having a number average particle size of from about 100 to about 800 Å and bearing a moiety having an opposite ionic character than either the anion or the cation resin. The polymer particles are employed in an amount which reduces the clumping or interaction between the ion exchange resins. The contact of the resins with the polymer is conducted either prior, during or subsequent to the formation of the mixed resin bed.

In still another aspect, the present invention is the resin bed comprising an anion exchange resin and a cation exchange resin, wherein the surface charge of the anion or cation resin has been sufficiently neutralized by the aforedescribed polymer particles such that the clumping or interaction of the anion and cation resins in the mixed resin bed is reduced.

Surprisingly, by the method of the present invention, the surface charge exhibited by an ion exchange resin is reduced without the other desirable properties of the resin, such as the resin's ion exchange kinetics or capacity, being significantly affected. Therefore, the treated resin is effectively employed in a mixed resin bed to reduce the clumping and agglomeration of the resins in the resin bed.

Thus, the ion exchange resins treated by the method of the present invention are particularly useful as a resin component of a mixed resin bed. The mixed resin bed containing such treated resins are useful in a wide variety of ion exchange operations such as the purification of water and other liquids.

DETAILED DESCRIPTION OF THE PREFERRED EMBODIMENTS

The term "ion exchange resin" is used conventionally herein and refers generally to weak and strong acid cation exchange resins and weak and strong base anion exchange resins of either the gel or macroporous type. Cation exchange resins and anion exchange resins (hereinafter generally referred to as cation resins and anion resins) are well known in the art and reference is made thereto for the purpose of this invention. Such resins and the methods of their preparation as granules or spheroidal bead form are illustrated in *Ion Exchange* by F. Helfferich, published in 1962 by McGraw-Hill Book Company, New York and U.S. Pat. Nos. 2,366,007; 2,591,573; 2,597,437; 2,597,438; 2,614,085; 2,614,099; 2,518,420 and 3,549,562.

Advantageously, the ion exchange resins employed herein are prepared as spheroidal polymer beads having a volume average particle size from about 0.15 to about 0.84, preferably from about 0.3 to about 0.7, mm.

Of particular interest herein are the strong acid cation resins and the strong base anion resins, preferably those resins derived from a monovinylidene aromatic such as styrene or monoalkyl substituted styrene, e.g., vinyltoluene, and a cross-linking agent copolymerizable therewith. Preferred cross-linking agents include the di- or polyvinylidene aromatics such as divinylbenzene and divinyltoluene and ethylene glycol dimethacrylate. Particularly preferred strong acid cation resins are the sulfonated copolymers of a monovinylidene aromatic and a copolymerizable cross-linking agent. Particularly preferred strong base anion resins are the cross-linked polymers of a monovinylidene aromatic bearing quaternary ammonium groups. In such preferred cation and anion resins, the monovinylidene aromatic is preferably styrene and the cross-linking agent therefor is preferably divinylbenzene.

The water-insoluble polymers useful in the practice of the present invention are those water-insoluble polymers bearing a moiety having an opposite ionic character than the surface of the ion exchange resin being treated. For example, the ionic polymer employed to reduce the surface charge exhibited by an anion resin bears an anionic moiety, whereas the ionic polymer employed to treat a cation resin bears a cationic moiety (hereinafter, water-insoluble polymers having such ionic character will be referred to as "ionic polymer").

The ionic polymers of the present invention are advantageously prepared from one or more nonionic monomers, which monomers, when polymerized, form a water-insoluble polymer. To impart the desired water solubility to the polymer particles, a cross-linking monomer copolymerizable with the nonionic polymers is preferably employed. By "water-insoluble" it is meant that the polymer is essentially completely insoluble, i.e., does not form a true solution of molecular size particles, in water. Advantageously, the polymer forms less than about a 2, more advantageously less than about a 1, weight percent solution in water.

The monomers advantageously employed in preparing the water-insoluble polymers include those $\alpha,\beta$-ethylenically unsaturated monomers conventionally employed hereto in the preparation of water-insoluble polymer particles using emulsion polymerization techniques. Illustrative of such monomers are those presented in *Polymer Processes,* edited by Calvin E. Schildknecht, published in 1956 by Interscience Publishers, Inc., New York, Chapter IV, "Polymerization in Emulsion" by H. Leverne Williams. In Table II on pages 122 and 123 are listed diverse kinds of monomers which can polymerize alone (homopolymers) or in mixtures to form water-insoluble polymer particles. Representative of such monomers are monovinylidene aromatics including styrene, vinyltoluene, ethyl vinylbenzene, $\alpha$-methyl styrene, chlorostyrene, bromostyrene, isopropylstyrene, dimethyl styrene, diethyl styrene and the like; alkyl esters of $\alpha,\beta$-ethylenically unsaturated carboxylic acids such as methyl acrylate, methyl methacrylate and ethyl acrylate; vinyl aliphatic and alicyclic hydrocarbons such as 1,3-butadiene, 2-methyl butadiene, 2,3-dimethyl butadiene, cyclopentadiene, mixtures thereof and the like. Of such monomers, those advantageously employed in the preparation of the water-insoluble polymers are typically selected on the basis of their polymeric properties. In general, the monovinylidene aromatics, particularly styrene, and mixtures thereof with an alkyl ester of an $\alpha,\beta$-ethylenically unsaturated carboxylic acid, particularly ethyl or methyl methacrylate, are preferred herein.

The cross-linking monomers preferably employed in the water-insoluble polymers are ethylenically unsaturated monomers containing two or more nonconjugated terminal vinyl end groups. Representative of such cross-linking monomers are di- or polyvinylidene aromatics such as divinylbenzene or diallyl phthalate; di- or polyacrylates such as 1,3-butylene diacrylate or ethylene glycol dimethacrylate; alkyl methacrylate and crotyl methacrylate and the like. The cross-linking agents most advantageously employed herein are dependent on a variety of factors including the desired polymeric properties and the monomers employed in preparing the polymer particles. In general, the polyvinylidene aromatics, particularly divinylbenzene, are employed herein. Advantageously, the cross-linking monomer is employed in an amount from about 0.1 to about 25, preferably from about 0.2 to about 10, weight percent based on the weight of the insoluble monomers employed in the preparation of the ionic polymer.

The ionic polymer bears an ionic moiety (ionic group) capable of reducing the surface charge exhibited by an ion exchange resin when said ionic group is attached, preferably chemically bonded, to the water-insoluble polymer. Representative of such cationic groups (moieties) are quaternary ammonium groups, i.e., $-N^{\oplus}(R)_3$; quaternary phosphonium groups, i.e., $-P^{\oplus}(R)_3$ and tertiary sulfonium groups, i.e., $-S^{\oplus}(R)_3$ wherein each R is individually a hydrocarbyl or substituted hydrocarbyl group. Representative anionic groups include sulfate, i.e., $-SO_3^-$; sulfonate groups, i.e., $-OSO_3^-$; carboxylate groups, i.e., $-COO^-$; phosphate groups, i.e., $-PO_3^=$ and phosphinate groups, i.e., $HPO_2^-$. The counter ion associated with said ionic groups can be any conventional counter ion such as hydrogen, ammonia, an alkali metal or alkaline earth metal for the anionic groups and halogen for the cationic groups. Preferably, in reducing the surface charge of a cation exchange resin, a quaternary ammonium group is employed and a sulfonate group is preferably employed in reducing the surface charge of an anion resin.

In one method for introducing the ionic moiety to the polymer, a copolymerizable monomer bearing suitable ionic groups is employed. In general, such ionic monomers are ethylenically unsaturated monomers which are copolymerizable with the nonionic monomers using emulsion polymerization techniques and which impart the desired ionic charge to the resulting water-insoluble polymer. Examples of ionic monomers bearing anionic groups include the $\alpha,\beta$-ethylenically unsaturated carboxylates (i.e., carboxylic acids and salts thereof) such as acrylic, methacrylic, maleic, itaconic or fumaric acid and ethylenically unsaturated sulfonates (i.e., sulfonic acids and salts thereof) such as the monovinylidene aromatic sulfonic acids, e.g., vinylbenzene sulfonic acid and styrene sulfonic acid and N-sulfonic acid derivatives such as 1-acrylamide-1-ethane sulfonic acid, including the salts of said acids. Representative monomers bearing cationic groups include ethylenically unsaturated ammonium compounds such as vinylbenzyl ammonium halide, e.g., vinylbenzyl trialkyl ammonium halide; ethylenically unsaturated sulfonium compounds such as vinylbenzyl dialkyl sulfonium halide and vinylbenzyl alkylhydroxyalkyl sulfonium halide and allyl and diallyl ammonium compounds such as allyl ammonium chloride and diallyl ammonium chloride. Of such ionic monomers, the monovinylidene aromatic sulfonic acids, particularly vinylbenzyl sulfonic acid, and acrylic or methacrylic acid are the preferred anionic monomers and the preferred cationic monomers are the vinylbenzyl ammonium compounds, particularly vinylbenzyl trialkyl ammonium chloride, more particularly vinylbenzyl trimethyl ammonium chloride.

Alternatively, the ionic groups can be introduced in the ionic polymer by polymerizing with the nonionic monomer an essentially neutral comonomer bearing a group which can be converted to an ionic group, i.e., a monomer such as vinyl pyridine or 2-aminoethyl methacrylate bearing an amine group which can be quaternized subsequent to polymerization to impart cationic character to the polymer.

When employed, the amounts of the ionic monomer advantageously employed in the preparation of the ionic polymer are dependent on a variety of factors including the specific ionic group or groups being introduced into the polymer, and the desired polymer properties. In general, the ionic monomers normally form water-soluble polymers when polymerized alone and/or their solubility in an aqueous liquid is dependent on the liquid's pH. Since the particle size of the ionic polymer is advantageously relatively independent of pH, the amount of the ionic monomer is generally selected such that the polymer particles are water-insoluble particles whose size is not significantly affected by pH. Advantageously, the polymer particles are essentially nonswelling, preferably never exhibiting a particle size more than about 2 times, more preferably more than 50 percent, larger than the particle's original size. Advantageously, the ionic monomers are employed in the salt form during polymerization and generally in amounts such that they comprise from about 0.1 to about 15 mole percent of the water-insoluble polymer.

Alternatively, the ionic moiety can be introduced in the ionic polymer by means of a compound reactive with the polymer which compound bears a suitable ionic moiety. For example, such reactive compounds can be chain initiators or chain terminators bearing a suitable ionic group which can be employed to initiate or terminate free-radical polymerization and which are capable of introducing ionic groups in the terminal position of the water-insoluble polymer. As an example thereof, compounds bearing an anionic group including the persulfate initiators such as sodium persulfate, ammonium persulfate and potassium persulfate; activators or reducing agents (generally employed in redox type initiation) such as the sulfites, e.g., sodium sulfite; bisulfites, e.g., sodium bisulfite and ammonium bisulfite; and metabisulfites, e.g., sodium metabisulfite; may become chemically bound to the polymer and impart an anionic charge thereto. In general, such an ionic chain terminator provides the water-insoluble polymer with a sufficient number of ionic groups to neutralize the surface charge exhibited by an ion exchange resin and an ionic monomer need not be employed therewith.

Although a cationic or anionic emulsifier will also impart an ionic character to the water-soluble polymer, due to the potential desorption thereof from the polymer particle, this method is not generally preferred for obtaining a polymer having the desired ionic character.

The aqueous dispersion of the ionic polymer (hereinafter referred to as the "ionic polymer dispersion") is a dispersion consisting of a continuous aqueous phase having distributed therethrough finely divided particles of the ionic polymer, said polymer particles having a number average particle size of from about 100 to about 800 Å wherein number average particle size is determined using conventional techniques such as dissymmetry measurement techniques. Preferably, the number average particle size of the water-insoluble polymer is from about 150 to about 500, more preferably from about 200 to about 400, Å. In the normal practice of the present invention, the ionic polymer dispersion is prepared using conventional emulsion polymerization techniques such as described by U.S. Pat. Nos. 2,520,959 and 3,397,165, hereby incorporated by reference. Such techniques conventionally involve dispersing the desired monomers in an aqueous polymerization medium which typically contains an emulsifying agent, i.e., surfactant (generally from about 3 to about 40 weight percent based on the weight of the monomers) and, optionally, other conventionally employed polymerization aids, e.g., chain transfer agent, chelating agent or the like, and exposing the monomers to a free-radical initiation means. Polymerization of the monomers to form water-insoluble polymer particles generally consists of heating the emulsified mixture to temperatures from about 50° to about 110° C., preferably from about 70° to about 100° C., for periods sufficient to convert the desired amounts of monomer to polymer.

Free-radical initiation means employed in preparing the water-insoluble polymer particles and subsequently added with the reactive monomers includes UV light, heat and/or conventional chemical initiators such as the peroxygens (e.g., t-butyl hydroperoxide, cumene hydroperoxide and hydrogen peroxide), persulfates (e.g., potassium persulfate, sodium persulfate and ammonium persulfate) and the like. Of particular interest herein are those initiators such as the persulfates which introduce ionic groups into the resulting polymer. Typically, such initiators are employed in amounts typically employed in conventional emulsion polymerization processes with from about 0.5 to about 3 weight percent of the initiator based on the total weight of the monomers being conventionally employed.

Surfactants suitably employed in the practice of this invention include cationic, anionic and nonionic surfactants employed hereto in conventional emulsion polymerizations. Illustrative examples of such surfactants are listed in McCutcheon's *Detergents and Emulsifiers*, edited by J. W. McCutcheon, published in 1977 by John W. McCutcheon, Inc., Morristown, N. J. Representative cationic surfactants listed therein which are useful in the practice of this invention include the salts of aliphatic amines, especially fatty amines; quaternary ammonium salts and hydrates; fatty amides derived from disubstituted diamines; fatty chain derivatives of pyridinium compounds; ethylene oxide condensation products of fatty amines; sulfonium compounds; isothiouronium compounds and phosphonium compounds. Representative anionic surfactants useful herein include the alkyl aryl sulfonates such as sodium dodecylbenzenesulfonate, alkyl phenoxy polyethylene sulfonates, lauryl sulfates, common soaps and the like. Representative nonionic surfactants useful herein include the reaction product of an alkylene oxide with alkylated phenols or long chain, e.g., about 6 to about 20 carbon atoms, fatty alcohols, fatty acids, alkyl mercaptans and primary amines; monoesters, e.g., the reaction product of polyethylene glycol with a long chain carboxylic acid with polyglycol ethers of polyhydric alcohol.

Of such surfactants, those which effectively stabilize the dispersion during the polymerization of the monomers and which do not neutralize or otherwise affect the ionic groups in the resulting polymer are advantageously employed. Such surfactants will vary depending on a variety of factors including the type of monomers employed in preparing the polymer particles. Particularly critical to the choice of surfactant is the type of ionic polymer being prepared. For example, cationic surfactants, preferably cationic surfactants having pH independent cationic groups, are advantageously employed when the monomers being polymerized comprise a cationic monomer. Alternatively, anionic surfactants are more advantageously employed with monomers bearing an anionic group. In the preparation of the water-insoluble polymer, the surfactant is generally advantageously employed in amounts ranging from about 3 to about 40 weight percent based on the total weight of the monomers being polymerized.

In the practice of the present invention, the ion exchange resin being treated is contacted with sufficient amounts of the ionic polymer to reduce the surface charge exhibited by the ion exchange bead, i.e., a neutralizing amount. By the term "reduce the surface charge" it is meant that the charge exhibited by the surface of the ion exchange bead treated with the ionic polymer is reduced by a measurable amount when compared to the surface charge by an ion exchange resin which has not been so treated. In general, the reduction in surface charge of the ion exchange resin is evidenced by the reduction in the clumping or interaction between the treated ion exchange resin and an untreated resin of different ionic character. Such reduction in clumping is readily measured using conventional techniques such as the techniques described by Example 1. Preferably, by the test method exemplified therein, the surface charge of the treated resin is reduced by an amount such that the tapped volume of a mixture of anion and cation exchange resins, wherein one resin type has been treated with the ionic polymer of opposite ionic character, is no more than about 30, preferably no more than about 10, percent, by volume, greater than the cumulative volume of the separate anion and cation resins. Most preferably, the tapped volume of the resin mixture is essentially equal to the cumulative volumes of the individual resins. Advantageously, such amounts do not deleteriously and significantly affect the other properties of the ion exchange resin such as the resin's ion exchange kinetics.

The amount of the ionic polymer employed to reduce the surface charge of the ion exchange resin by the desired amount will vary depending on a variety of factors including the composition of the ionic polymer and the specific ion exchange resin. Typically, however, the ionic polymer is advantageously employed in an amount ranging from about 0.005 to about 1, weight percent based on the total weight of the ion exchange resin being treated. Preferably, the ionic polymer is employed at a concentration of from about 0.0075 to about 0.15, more preferably from about 0.01 to about 0.045, weight percent, said weight percents being based on the weight of the ion exchange resin being treated.

In the practice of this invention, the ionic polymer dispersion (dilution) and ion exchange resin (water-swollen condition) being treated are mixed at conditions sufficient to provide intimate contact between the ion exchange resin and the ionic polymer. In general, mild agitation of the admixture is sufficient to provide such contact. After providing the required contact period, the treated ion exchange resin is advantageously washed with water until the normally milky white appearance of the ionic polymer dispersion has been removed therefrom.

In preparing a mixture resin bed of the anion and cation exchange resins which resin bed exhibits reduced clumping, either the anion or cation resin is advantageously initially treated with a suitable ionic polymer and the treated resin subsequently admixed with the untreated resin exhibiting the opposite ionic charge. Alternatively, but less preferred, the anion and cation exchange resins can be mixed and the ionic polymer dispersion admixed with the mixed resin bed to reduce the surface charge exhibited by either resin type.

The following examples are set forth to illustrate the invention and should not be construed to limit its scope. In the examples, all parts are by weight unless otherwise specified.

EXAMPLE 1

Into a suitable size reactor vessel equipped with agitation means, thermometer, heating and cooling means and monomer and aqueous feed reservoirs is added 100 parts of water, 10 parts of an anionic surfactant and 0.10 part of a persulfate initiator. The vessel is purged with nitrogen and heated to 90° C. A monomer feed consisting of 85 parts of styrene, 10 parts of methyl methacrylate, 4 parts of acrylic acid and 1 part of divinylbenzene is added to the vessel over a threehour period concurrently with an aqueous feed stream of 65 parts of water and 0.90 part of a persulfate initiator. The vessel is maintained at 90° C. during this addition and for an additional two hours. The flask is then cooled to 20° C. The resulting dispersion consists of 36 weight percent of ionic polymer particles having a number average particle size of about 400 Å as determined by conventional dissymmetry measurement techniques.

To determine the ability of the ionic polymer to reduce the surface charge of an anion exchange resin, the following procedure is employed.

Sufficient water is added to the aqueous dispersion of the ionic polymer particles to dilute the dispersion to about 150 parts of ionic polymer per million parts of the dispersion. A 100 ml portion of this diluted dispersion is then added to a 0.25 liter bottle containing a 100 ml portion of strong base anion exchange resin beads having a number average particle size of about 650 mm and bearing trimethylbenzyl ammonium ion active exchange groups in the chloride form. The resulting mixture is mildly shaken for a period of 30 minutes to insure complete contact between the resin beads and the ionic polymer. The mixture is then washed with deionized water until the wash water becomes clear.

To determine the degree of clumping, which relates to the effectiveness of the ionic polymer in reducing the surface charge of said beads, exhibited by the anion resin beads, an amount of the water-swollen, treated anion resin beads sufficient to have a volume of 54 ml upon settling and a volume of 50 ml upon tapping the settled beads are combined with an amount of water-swollen, cation resin beads having a volume upon settling of 51 ml and a volume of 50 ml upon tapping the settled beads. The combination of cation and treated anion resins is shaken well and the resins allowed to settle. Upon settling, the volume of the resin mixture is 105 ml. This volume is identical to the cumulation of the settled volumes of individual resins including that the ionic polymer effectively reduces the interaction of the anion and cation resins. Upon tapping the settled resin mixture, the resin volume is further reduced to 100 ml. This volume is identical to the cumulation of the tapped volume of the individual resin, again indicating the effectiveness of the ionic polymer in reducing the surface charge exhibited by the anion exchange resin.

For purposes of comparison, 50 ml (tapped volume) of identical anion exchange resin beads which have not been treated with the ionic polymer dispersion are combined with 50 ml (tapped volume) of identical cation exchange resin beads. Following vigorous shaking of the resins, the settled volume of this combination is 170 ml or 65 ml more than the cumulative volume of the individual settled volumes of the anion and cation resins, indicating significant interaction between the anion and cation resins. Similarly, upon tapping the settled mixture, the tapped volume is 150 ml or 50 ml more than the cumulative tapped volume of the individual resins, again indicating the presence of significant interaction between the anion and cation resin.

EXAMPLE 2

Strong base anion exchange resin beads in the chloride form are treated with the ionic polymer of Example 1 and subsequently converted to hydroxide form. A mixed resin bed (Sample No. 1) is prepared by intermixing 50 ml (tapped volume) of the treated, water-swollen anion exchange resin beads with 50 ml (tapped volume) of the hydrogen form of a strong acid cation resin in a glass column having a 31 mm inside diameter. For purposes of comparison, identical strong base anion resin beads in the chloride form are treated with the various conventional polyelectrolytes specified in Table 1 and subsequently converted to hydroxide form. Mixed resin beds (Sample Nos. C-1 and C-2) are prepared by intermixing 50 ml (tapped volume) of these treated beads with 50 ml (tapped volume) of the hydrogen form of strong acid cation resin beads identical in all respects to the cation resin beads employed in preparing Sample No. 1.

To determine the effectiveness of the various mixed resin beds in removing ions from solution, a 0.01 Normal aqueous solution of sodium chloride, wherein Normality is the equivalent weight of the dissolved NaCl per liter of solution, is passed through the column at a rate of 50 ml per minute and the resistivity of the liquid exiting from the column measured. The higher the resistance of the exiting liquid indicates the more complete removal of the ions from solution. The results of the resistivity testing is recorded in Table I.

TABLE I

| Sample No. | Anti-Clump Agent[1] Type | Amount, ppm | Resistance ($\Omega$/cm $\times 10^{-5}$)[2] Bed Volumes | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| C-1* | PSPS | 1500 | 31 | 32 | 33 | 34 | 34 | 35 | 35 | 36 | 36 | 36 | 20 | — | — | — |
| C-2* | EEA | 1500 | 49 | 50 | 50 | 50 | 40 | 30 | 24 | 22 | 20 | 17 | 14 | 10 | — | — |
| 1 | IPD | 1500 | 43 | 43 | 45 | 46 | 47 | 48 | 48 | 49 | 49 | 49 | 49 | 43 | 26 | 10 |

*Not an example of this invention.
[1]The type of anti-clump agent is given in abbreviated form wherein:
PSPS = a water-soluble sulfonated polystyrene
EEA = a water-swellable, cross-linked polymer of an $\alpha,\beta$-ethylenically unsaturated carboxylic acid sold as ASE-60 by Rohm & Haas Company
IPD = an ionic polymer of the present invention similar in all respects to the ionic polymer employed in Example 1.
[2]The resistance is the resistance of the liquid exiting from the column containing the mixed resin bed. Bed volumes is the total volume of NaCl solution passed through the mixed resin bed, wherein each bed volume is equivalent to the volume of the mixed resin bed.

As evidenced by the data in Table I, the mixed resin bed containing the anion resin beads treated with the ionic polymer of the present invention more effectively removes ions from solution as evidenced by the large volume of NaCl solution passed through the bed prior to a significant loss in the resistivity of the exiting liquid. In addition, the measured resistivity values of the liquid exiting from the mixed resin bed indicates the mixed resin bed of the present invention possesses desirable kinetics, i.e., exchanges ions in solution at a relatively fast rate without the leakage of undesirable ionic components.

What is claimed is:

1. A method for reducing the clumping or interaction exhibited between cation and anion exchange resins in a resin bed comprising a mixture of cation and anion exchange resins, said method comprising the step of contacting the cation or anion resin prior, during or subsequent to the formation of the mixed resin bed with an aqueous dispersion of water-insoluble polymer particles having a number average particle size from about 100 to about 800 Å and bearing a moiety having an opposite ionic character than the cation or anion resin being treated, wherein the water-insoluble polymer particles are employed in an amount sufficient to reduce the clumping or interaction of the cation and anion resins but less than an amount which significantly affects the ion-exchange kinetics of the treated cation or anion resin.

2. A method for reducing the clumping or interaction exhibited between cation and anion exchange resins in a resin bed comprising a mixture of cation and anion exchange resins, said method comprising the step of contacting the cation or anion resin prior, during or subsequent to the formation of the mixed resin bed with an aqueous dispersion of water-insoluble polymer particles having a number average particle size from about 100 to about 800 Å and bearing a moiety having an opposite ionic character than the cation or anion resin being treated, which particles are prepared using an emulsion polymerization process, wherein the water-insoluble polymer particles are employed in an amount sufficient to reduce the clumping or interaction of the cation and anion resins but less than an amount which significantly affects the ion-exchange kinetics of the treated cation or anion resin.

3. The method of claim 1 or 2 wherein the ion exchange resin being treated is an anion exchange resin and the polymer particles comprise a water-insoluble polymer having a carboxylate, sulfonate, phosphonate or phosphinate group chemically bonded pendant thereto.

4. The method of claim 3 wherein the anion exchange resin is a strong base anion exchange resin comprising a copolymer of a monovinylidene aromatic and a divinylidene aromatic bearing quaternary ammonium groups.

5. A resin bed comprising a mixture of an anion exchange resin and cation exchange resin wherein the anion or cation exchange resin has been treated with water-insoluble polymer particles having a number average particle size from about 100 to about 800 Å and bearing a moiety having an opposite ionic character than one of the resins, said polymer particles being employed in an amount sufficient to reduce the surface charge exhibited by one of the resins but less than an amount which significantly affects the ion-exchange kinetics of the treated anion or cation resin.

6. A resin bed comprising a mixture of an anion exchange resin and cation exchange resin wherein the anion or cation exchange resin has been treated with water-insoluble polymer particles having a number average particle size from about 100 to about 800 Å and bearing a moiety having an opposite ionic character than one of the resins, which particles are prepared using an emulsion polymerization process, said polymer particles being employed in an amount sufficient to reduce the surface charge exhibited by one of the resins but less than an amount which significantly affects the ion-exchange kinetics of the treated anion or cation resin.

7. The resin bed of claim 5 or 6 wherein the water-insoluble polymer particles comprise the copolymerization product of a nonionic $\alpha,\beta$-ethylenically unsaturated monomer which, when homopolymerized, forms a water-insoluble polymer; an ethylenically unsaturated, cross-linking monomer bearing two or more non-conjugated terminal vinyl end groups and an ionic monomer of an $\alpha,\beta$-ethylenically unsaturated carboxylate salt thereof, an ethylenically unsaturated sulfonate, an ethylenically unsaturated ammonium compound, an ethylenically unsaturated sulfonium compound or an allyl or diallyl ammonium compound.

8. The resin bed of claim 7 wherein the nonionic monomer is a monovinylidene aromatic, an alkyl ester of an $\alpha,\beta$-ethylenically unsaturated carboxylic acid or a vinyl aliphatic or alicyclic hydrocarbon and the cross-linking monomer is a di- or polyvinylidene aromatic, a di- or polyacrylate, allyl acrylate or crotyl acrylate.

9. The resin bed of claim 8 wherein the ion exchange resin being treated is an anion exchange resin and the ionic monomer is an $\alpha,\beta$-ethylenically unsaturated carboxylate, a monovinylidene aromatic sulfonate or ethylenically unsaturated N-sulfonate.

10. The resin bed of claim 7 wherein the exchange resin being treated is a cation exchange resin and the ionic monomer is a vinylbenzyl trialkyl ammonium halide, a vinylbenzyl dialkyl sulfonium halide, a vinylbenzyl alkylhydroxyalkyl sulfonium halide or an allyl or diallyl ammonium halide.

11. The resin bed of claim 5 or 6 wherein a chain terminator or chain initiator which can be employed to initiate or terminate free-radical polymerization is employed to introduce the ionic moiety in the ionic polymer.

12. The resin bed of claim 11 wherein the ion exchange resin being treated is an anion exchange resin and a persulfate initiator is employed to introduce the ionic moiety in the ionic polymer.

13. The method of claim 1 or 4 wherein the ion exchange resin being treated is a cation exchange resin and the water-insoluble polymer has a quaternary ammonium, quaternary phosphonium or tertiary sulfonium group chemically bonded pendant thereto.

14. The method of claim 4 wherein the cation exchange resin is a strong acid cation exchange resin comprising a sulfonated copolymer of a monovinylidene aromatic and a divinylidene aromatic.

* * * * *